United States Patent [19]

Robinson et al.

[11] Patent Number: 5,059,094
[45] Date of Patent: Oct. 22, 1991

[54] ROTOR REDUNDANT FORCE RETENTION SYSTEM FOR VTOL AND VSTOL AIRCRAFT

[75] Inventors: Madison K. Robinson, Bedford; Martin H. Lufkin, Hurst; William D. Neathery, North Richland Hills, all of Tex.

[73] Assignee: Bell Helicopter Textron, Inc., Forth Worth, Tex.

[21] Appl. No.: 420,958

[22] Filed: Oct. 13, 1989

[51] Int. Cl.⁵ ............................................. B64C 27/37
[52] U.S. Cl. .................... 416/134 A; 416/141; 416/230
[58] Field of Search ........... 416/103, 105, 131, 132 R, 416/134 A, 141, 230, 241 A

[56] References Cited

U.S. PATENT DOCUMENTS

| | | | |
|---|---|---|---|
| 3,556,673 | 11/1971 | Killian | 416/141 X |
| 3,761,199 | 9/1973 | Ferris et al. | 416/141 X |
| 3,932,059 | 1/1976 | Rybicki | 416/141 X |
| 3,967,918 | 7/1976 | Mouille et al. | 416/141 |
| 4,012,169 | 3/1977 | Mouille et al. | 416/134 A |
| 4,227,857 | 10/1980 | Reyes | 416/134 A |
| 4,257,739 | 3/1981 | Covington et al. | 416/134 A |
| 4,264,277 | 4/1981 | McCafferty | 416/134 A |
| 4,293,276 | 10/1981 | Brogdon et al. | 416/134 A |
| 4,361,415 | 11/1982 | Aubry | 416/134 A |
| 4,369,019 | 1/1983 | Lovera et al. | 416/134 A |
| 4,512,717 | 4/1985 | Pancotti et al. | 416/134 A |
| 4,516,909 | 5/1985 | Caramaschi et al. | 416/134 A |
| 4,795,310 | 1/1989 | McArdle et al. | 416/134 A |
| 4,808,075 | 2/1989 | Pariani et al. | 416/134 A X |

Primary Examiner—John T. Kwon
Assistant Examiner—James A. Larson
Attorney, Agent, or Firm—Richards, Medlock & Andrews

[57] ABSTRACT

The system comprises a grip of composite material having belts, filament windings unidirectional material and fillers of off axis bias ply material for directing the CF exerted on the grip by the blade rotation to the clevis throat of the grip. The force is further directed through a CF fitting, a CF bearing and an OPCBA to the yoke, thereby maintaining the yoke in tension. Should this load path fail, the CF will be transmitted through the length of the grip to the IPCBA that will in turn load the yoke with the CF.

2 Claims, 4 Drawing Sheets

ROTOR REDUNDANT FORCE RETENTION SYSTEM FOR VTOL AND VSTOL AIRCRAFT

This invention was made with Government support under N00019-85-C-0145 awarded by Department of the Navy, Naval Air Systems Command. The Government has certain rights in this ivnention.

TECHNICAL FIELD OF THE INVENTION

This invention relates to systems for attaching helicopter rotor blades to the hub of a helicopter and providing redundant load paths for transmitting forces generated by rotating the helicopter blades to the hub.

BACKGROUND OF THE INVENTION

Numerous systems have been employed to attach rotor blades to the hub of a helicopter. These systems generally incorporate grips. The grips couple the rotor blade to the yoke. The directional and thrust control, such as pitch, of the blades is controlled through the grips. In the past, grips have been made from metals such as steel and aluminum. These metals are heavy, and weight is a design parameter that must be kept at a minimum in aircraft applications. Therefore, a need for a lightweight grip made from composite materials exists.

In many applications, it is desirable that the grips transfer the centrifugal forces (hereinafter CF) exerted by the rotation of a blade in flight to the yoke; placing the yoke in tension reducing bending stress by making the yoke a tension loading beam. Therefore, it is desirable to provide blade attachment systems that provide redundant load paths for transferring the CF from the blade to the yoke while reducing vibrations and meeting the design criteria for strength and stiffness.

SUMMARY OF THE INVENTION

The present invention generally incorporates a grip having a sleeve and clevis section. The grip is made up of composite materials such as carbon/epoxy or fiberglass/epoxy. Orientation of the composite material may be adjusted to meet the design parameters of required stiffness and strength. For instance, layers of unidirectional material, unidirectional belts, strands wound onto the grip at the appropriate orientation and carbon bias ply materials, make up the layers of the grip. Further, the belts of carbon are interspersed with layers of bias ply material achieved by filament windings or off axis orientation of unidirectional preprep material, located proximate to the attachment point of the blade, to direct the CF toward the clevis throat of the grip in order to achieve the desired primary load path. These bias ply materials provide the shear continuity to redirect the CF entering the grip to the clevis throat. From the clevis throat, the CF is transmitted to the extenions of CF fitting and then to a CF bearing that is attached to a spindle of the outboard pitch change bearing assembly (hereinafter "OPCBA") that is attached to the arm of the yoke. This load path directs the CF from the point where it enters the grip on to the yoke through the clevis throat, CF fitting, CF bearing and OPCBA. If this load path should fail, the grip is constructed in such a way that the load will be transferred along the grip to the inboard pitch change bearing assembly (hereinafter "IPCBA") attached to the yoke, which will again transmit the load to the yoke. Therefore, the present invention provides redundant load paths for transmitting the CF produced by the blade through the grip to the yoke.

BRIEF DESCRIPTION OF THE DRAWINGS

Further objectives and advantages of the present invention will become more apparent from the following detailed description and claims, and from the accompany drawings, wherein:

FIG. 7 is a lay up of the various layers of the composite materials on the mandrel.

DETAILED DESCRIPTION

Figure 1:
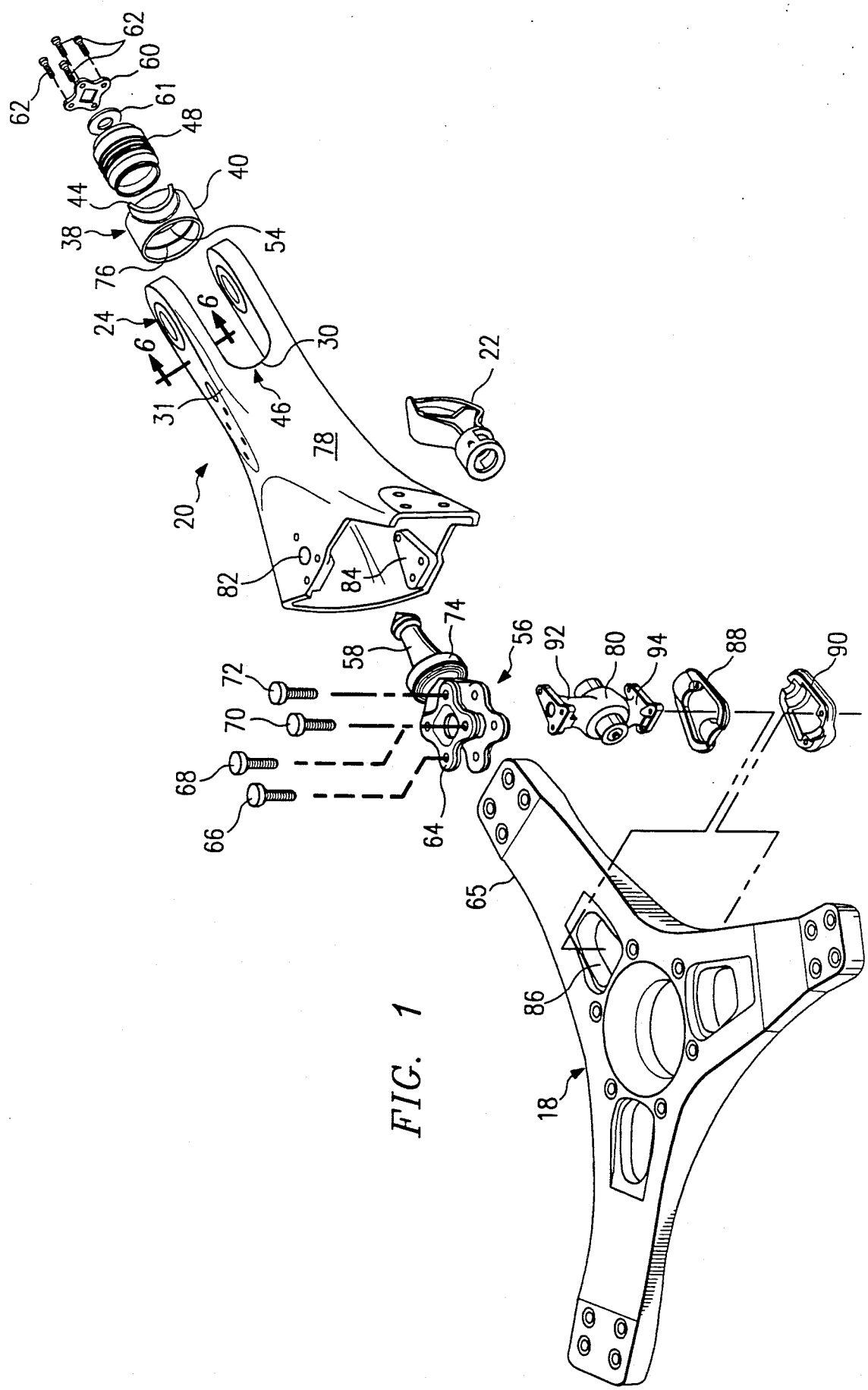
FIG. 1 is an exploded assembly drawing of the present invention and associated hub components.

The present invention is embodied in a three-bladed main rotor hub assembly 12 for a tilt rotor aircraft. As seen in FIGS. 1, 2, 3 and 4, the hub 12 comprising the yoke 18 and the other rotating controls is attached to the mast 14. The power plant of the aircraft drives the mast 14, the hub 12 and blades 16. Generally, yoke 18 is attached to mast 14. Grip 20 is attached to the hub 12 and blades 16 are attached to grip 20. The pitch horn 22 is attached to grip 20 for controlling the pitch angle of the blade 16 attached to the particular grip 20. The grip 20 is designed in such a way to achieve the desired load path to accommodate the CF while maintaining the desired strength and stiffness criteria.

In the present invention, blade 16 is attached to clevis 24 of grip 20 by means of a blade bolt 26 extending through blade bolt holes 25 in the clevis ears 28. When hub 12 is rotated, blade 16 exerts CF through blade bolt 26 to clevis ears 28. As set out earlier, it is desirable to direct this force to the load bearing clevis throat 30. If not directed to the clevis throat 30, the force will direct itself along the length of the grip. However, by properly locating filament winding material, having the proper orientation, within the grip, the load can be directed to the clevis throat 30. This is accomplished through belts 34, filament windings 36 and filler plies 33 located in the grip 20 proximate to the clevis 24 (see FIGS. 5 and 6).

Figure 4:
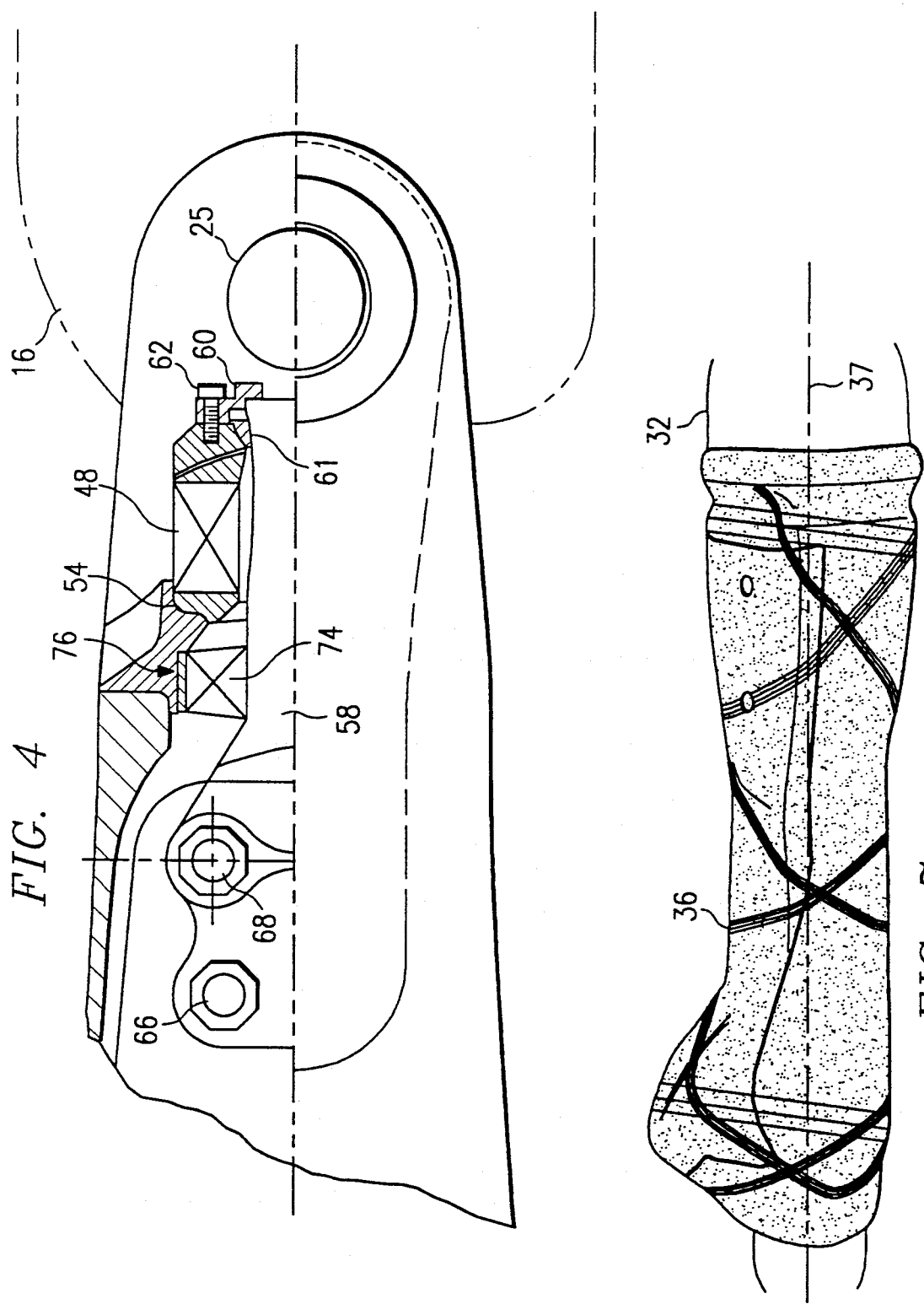
FIG. 4 is a top view of the invention and associated hub components.
Figure 5:
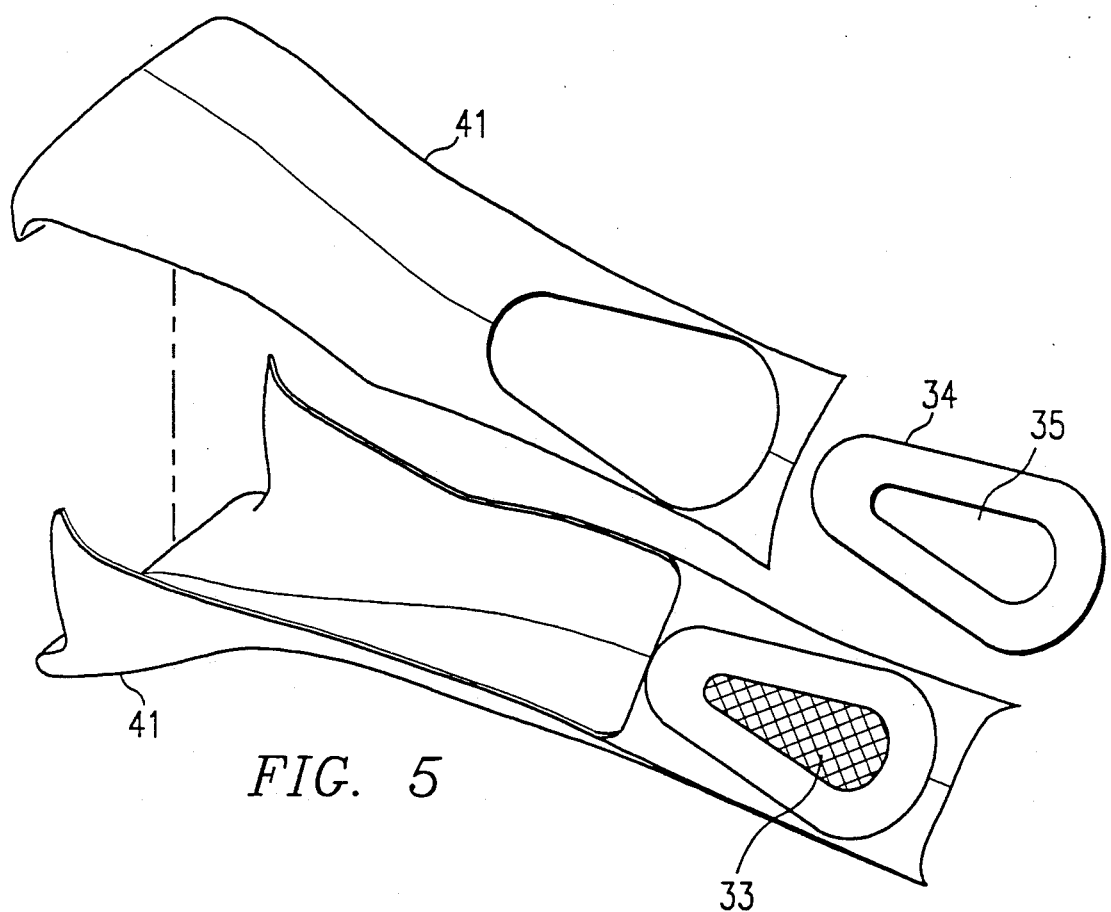
FIG. 5 is a set of layers of the belts and bias ply material.
Figure 6:
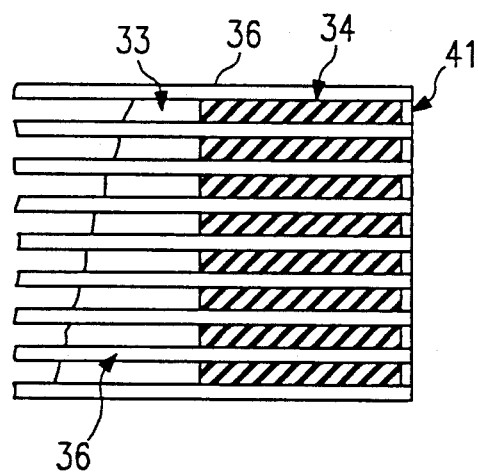
FIG. 6 is a partial cross-section showing the layer of belts and unidirectional material.

Belts 34 and filament windings 36 provide the means by which the CF is directed toward the clevis throat 30 from the blade bolt 26. The belts 34 are a track of bipolar windings of unidirectional carbon material impregnated with epoxy (hereinafter "carbon/epoxy") such as E773/IM6 or E773-2/IM6. These materials can be obtained in preprep rolls of specifically oriented material, preprep spools of woven material, or interwoven broadloom material. However, belts 34 can be made of fiberglass material impregnated with epoxy (hereinafter "fiberglass/epoxy"). The filament windings 36 are generally carbon/epoxy woven material wound onto the grip at ±45°. The filament windings 36 may also be made of fiberglass/epoxy material. The embodiment of the present invention includes sixteen layers of belts 34, twenty layers of filament windings 36 and sixteen layers of filler plies 33 and numerous unidirectional fillers 41, depending on the characteristics desired, that make the clevis 24 section. FIGS. 4, 5 and 6 show belts 34 and unidirectional fillers 41 that are made of carbon/epoxy and can be made of fiberglass/epoxy. FIG. 5 illustrates a representative layer of material used in the buildup of grip 20. Bolt holes 25 are formed in the larger end of cavity 35 through the filler plies 33 during the final machining of the built-up layers.

As shown in FIGS. 2, 4, 5 and 6, the belts 34 generally form a track and are layered in the grip to form the clevis ears 28. Interspersed between the belts 34 are filament windings 36 oriented at ±45°. The filler plies 33 of carbon/epoxy material biased at 45° positioned on the inside of belt 34 in cavity 35 and prevent the belt 34 from distorting under load. Unidirectional fillers 41 make up the bulk of grip 20, having filament windings 36 interspersed therebetween. The force enters the clevis ears 28 as tensile stress and such is transmitted through the belts 34. The force is then transmitted through the filament windings 36 via the resin bonds between the layers. Having the ±45° orientation, filament windings 36 channel the force to the grip shoulder 31 and ultimately to the clevis throat 30. The filament windings 36 have the proper orientation, thereby directing the force outwardly through the shoulder 31 into the clevis throat 30, rather than along the length of the grip 20. The orientation of the filament windings may be adjusted in order to achieve the desired strength and stiffness.

With reference now to FIG. 7, a male mandrel 32 is used to build the layers which comprise grip 20. Grip 20 is made up of unidirectional belts 41, belts 34, filament windings 36 and filler plies 33 with the sleeve 78 being made up of unidirectional belts 41 and filament windings 36 (see FIGS. 1 and 5). In order to orient the filament windings 36, the mandrel 32 is rotated while spools of carbon/epoxy woven threads are moved along axis 37, feeding the material onto the layers located on mandrel 32. The filament windings 36 are applied to the grip at a −45° orientation. The ±45° orientation is maintained with respect to axis 37 of the mandrel 32. However, it will be understood that as the cross section of the grip 20 varies from end to end, the orientation of the filament windings 36 will also vary. Further, it is beneficial to compact the layers together as the layers are built up. This may be accomplished by enclosing the mandrel 32 in plastic and applying a vacuum thereto for a period of time, depending on the number of layers and the degree of compactness desired. This is generally done periodically as the layers are built up; again depending on the properties desired. Once all of the layers are assembled, the male mandrel is removed before curing. The grip is placed in a female mold and an inflatable bag is inserted in the place of the mandrel 32 to maintain the shape of the part forcing the uncured grip against the female mold contours. The grip is then cured for an appropriate amount of time under the appropriate conditions, depending on the materials used, the stiffness and strength required and the size of the part. Once the grip 20 is cured, final machining of the part may be accomplished.

Figure 2:
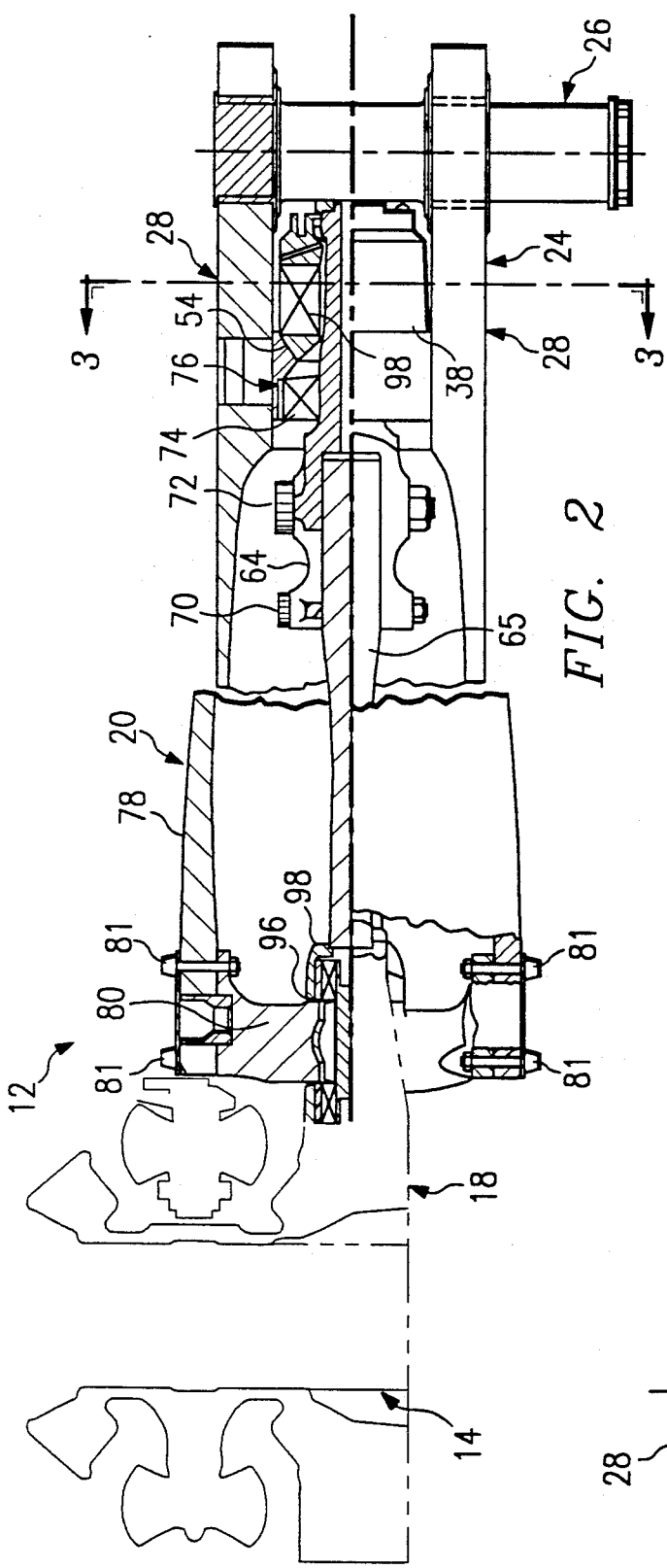
FIG. 2 is a sectional view of the assembled invention and associated hub components.
Figure 3:
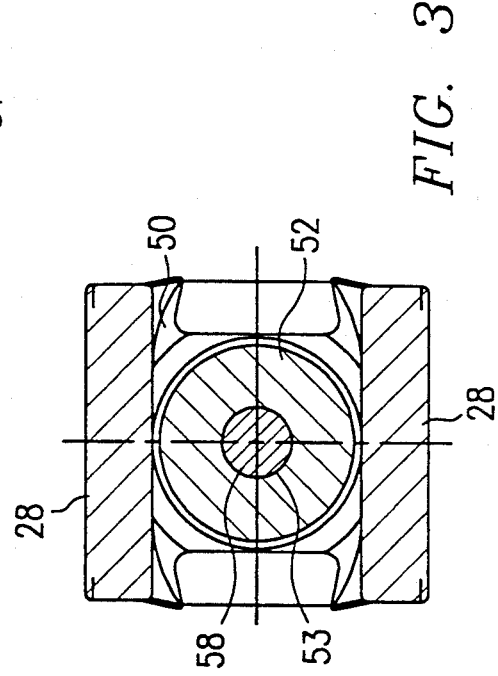
FIG. 3 is a cross-sectional view of the CF bearing taken through the assembly shown in FIG. 2.

With the grip 20 specifically constructed to channel the CF to the clevis throat 30, the load must be transmitted from the clevis throat 30 to the yoke 18. The force exerted on clevis throat 30 is transmitted through the centrifugal force transfer fitting 38 (hereinafter "CF fitting") and the centrifugal force bearing 48 (hereafter "CF bearing") attached to the OPCBA 56 that is attached to the arm 65 of the yoke 18 thereby maintaining the yoke 18 in tension. Specifically, CF fitting 38 is a hollow cylinder 40 having curved extensions 44 (only one shown) extending out from opposing sides of cylinder 40 perpendicularly to the axis of the cylinder 40. Located within the cylinder are shoulders 54 and 76. The CF fitting 38 is positioned in the clevis throat 30 so that extensions 44 rest against radius 46 of the clevis throat 30. The extensions 44 are sized such that they mate with the radius 46; providing a seat through which the CF channeled through the clevis throat 30 may pass to the CF bearing 48. The CF bearing is illustrated in FIGS. 2 and 3. The CF bearing generally comprises a housing 50 enclosing an elastomeric bearing 52 having a bore 53 therethrough. The elastomeric bearing 52 may be sized according to the stiffness and strength and torsional motion (pitch) required depending on the CF loads produced by the rotating blades. The CF bearing is seated against shoulder 54 of the CF fitting 38. CF is transmitted through the CF fitting to the CF bearing 48 through shoulder 54. OPCBA 56 has a spindle 58 that extends through cylinder 40 and bore 53 and attaches to CF bearing 48. Attachment is accomplished by bolting retainer 60 to the end of CF bearing 48 with bolts 62. Located between the CF bearing 48 and retainer 60 is split cone set 61. The spindle 58 extends back to the yoke 18 and attaches to the yoke 18 by bolting clevis 64 to the arm 65 of yoke 18 with bolts 66, 68, 70 and 72. Located along spindle 58 is an elastomeric bearing 74. Once the system is assembled, the bearing 74 is located in the cylinder 40 of the CF fitting 38 and rides against shoulder 76 of the CF fitting. This system is the primary load path and maintains the yoke 18 in tension. The load enters the grip 20 at the clevis 24 and is channeled to the clevis throat 30, through the CF fitting 38, the CF bearing 48 and OPCBA 56, thereby applying tension to the arm 65 of the yoke 18. By this load path, the hub 12 counteracts the CF rather than the grip.

Sleeve 78 of grip 20 provides a secondary load path for the CF and the redundant feature of the present invention. Should a component of the primary load path fail, the grip 20 itself will transmit the load to the yoke 18 from clevis 24 through sleeve 78 and IPCBA 80. As is readily seen in FIG. 2, the load is yoke applied to the clevis 24 of the grip 20. The primary load path to the yoke 18, through the CF fitting 38 and CF bearing 48 and OPCBA 56, is not available. Therefore, the load will be transmitted along the grip sleeve 78 to the IPCBA 80 through connection points 82 and 84 where the grip is attached to the IPCBA 80 by fasteners 81 or other suitable means. The IPCBA 80 is attached to the yoke 18 through cavity 86 by retainers 88 and 90. The load is transmitted through the connection points 82 and 84 and stems 92 and 94 of the IPCBA 80. A gap 96 is located between the stems 92 and 94 and bearing housing 98. The bearing housing 98 is located against the yoke 18 at cavity 86. Once the load is transmitted through the IPCBA 80, the gap 96 is closed against the bearing housing 98, thereby loading the yoke 18 with OF produced by the blade 16. This secondary load path provides the redundant feature of the retention system.

While one embodiment of the present invention has been described in the foregoing detailed description, and illustrated in the accompanying drawings, it will be understood that the invention is not limited to the embodiments disclosed, but is capable of numerous and elements without departing from the scope and spirit of the invention.

We claim:

1. A redundant force retention system for attaching a helicopter rotor blade to the yoke of the helicopter, comprising:
- a composite material grip having a clevis, a sleeve connected to said clevis, bolt holes for attaching said blade to said clevis, a clevis throat, and belts and filament windings for directing the centrifugal force created by blade rotation to the clevis throat;
- a hollow cylindrical fitting for transmitting centrifugal forces, having a first and second extension for mating with the clevis throat, a first and second shoulder located in the fitting and a bore therethrough;
- an elastomeric bearing having a force therethrough for transmitting centrifugal forces;
- an elastomeric pitch change bearing having a spindle and bolting clevis for transmitting centrifugal forces;
- a means for attaching said spindle to said elastomeric bearing;
- a means for attaching said bolting clevis to said yoke;
- the fitting is located in the clevis throat, mating the first and second extensions therewith, the elastomeric baring is located in the hollow cylindrical fitting and abuts the first shoulder thereof, the spindle of the pitch change bearing extends through the bore of the fitting and the bore in the elastomeric bearing and is attached to the elastomeric bearing such that the pitch change bearing abuts the second shoulder of the hollow cylindrical fitting; and
- centrifugal force is exerted on the grip by the blade, said force is directed by the belts and filament windings to said clevis throat, through the fitting, the elastomeric bearing and pitch change bearing, thereby loading the yoke in tension.

2. The system of claim 1, further comprising:
- an elastomeric inboard pitch change bearing having a housing abutting said yoke, means for attaching the grip to the yoke, a mating surface, a gap located between the mating surface and the housing; and
- when centrifugal force is applied to the inboard pitch change bearing through the grip, the gap closes and the inboard pitch change bearing mates with the yoke, thereby transmitting the centrifugal force load to the yoke.

* * * * *

UNITED STATES PATENT AND TRADEMARK OFFICE
CERTIFICATE OF CORRECTION

PATENT NO. : 5,059,094

DATED : October 22, 1991

INVENTOR(S) : Madison K. Robinson, et al

It is certified that error appears in the above-identified patent and that said Letters Patent is hereby corrected as shown below:

Abstract, line 2, after "windings" insert --,--.

Column 1, line 8), delete "ivnention" and insert therefore --invention--.

Column 1, line 51, delete "preprep" and insert therefore --prepreg--.

Column 2, line 58, delete "preprep" and insert therefore --prepreg--.

Column 2, line 59, delete "preprep" and insert therefore --prepreg--.

Column 2, lines 59-60, delete "broadloom" and insert therefore --broadgood--.

Column 3, line 13, after "at" insert --±--.

Column 3, line 13, after "45°" insert --are--.

Column 3, line 40, delete "-45°" and insert therefore --±45°--.

Column 4, line 5, delete "perpendicularly" and insert therefore --perpendicular--.

Column 4, line 44, after "load is" delete "yoke".

Column 4, line 66, after "numerous" insrt --rearrangements, modifications and substitutions of parts--.

UNITED STATES PATENT AND TRADEMARK OFFICE
CERTIFICATE OF CORRECTION

PATENT NO.   :   5,059,094

DATED        :   October 22, 1991

INVENTOR(S)  :   Madison K. Robinson, et al

It is certified that error appears in the above-identified patent and that said Letters Patent is hereby corrected as shown below:

Column 5, line 3, delete "the" and insert therefore --a--.

Column 5, line 15, delete "force" and insert therefore --bore--.

Column 6, line 1, delete "baring" and insert therefore --bearing--.

Signed and Sealed this

Thirtieth Day of March, 1993

Attest:

STEPHEN G. KUNIN

Attesting Officer

Acting Commissioner of Patents and Trademarks